Oct. 1, 1968  S. A. PARKER  3,403,847

CYLINDER AND VALVE ASSEMBLY

Filed Oct. 17, 1966  3 Sheets-Sheet 1

Inventor:
Sidney A. Parker
By Bair, Freeman & Molinare
Attys.

Oct. 1, 1968  S. A. PARKER  3,403,847
CYLINDER AND VALVE ASSEMBLY
Filed Oct. 17, 1966  3 Sheets-Sheet 2

Inventor:
Sidney A. Parker
By Bair, Freeman & Molinare
Attys.

Oct. 1, 1968   S. A. PARKER   3,403,847
CYLINDER AND VALVE ASSEMBLY
Filed Oct. 17, 1966   3 Sheets-Sheet 3

Inventor:
Sidney A. Parker
By Bair, Freeman & Molinare
Attys.

United States Patent Office 3,403,847
Patented Oct. 1, 1968

3,403,847
CYLINDER AND VALVE ASSEMBLY
Sidney A. Parker, Fort Worth, Tex., assignor to
Lennox Industries Inc.
Filed Oct. 17, 1966, Ser. No. 587,006
10 Claims. (Cl. 230—231)

ABSTRACT OF THE DISCLOSURE

A cylinder sleeve and a valve structure are joined to one another to form a unit adapted to be tested and inserted into a compressor so as to facilitate fabrication thereof.

This invention relates to a cylinder sleeve and valve assembly, and more particularly, to an assembly which can be tested and inserted as a unit in a refrigerant compressor crankcase.

In the manufacture of refrigerant compressors, it has been proposed to use cylinder sleeves or inserts which mount in the crankcase after completion thereof and separate valve structures which are separately mounted in the crankcase. Such constructions require separate inventory and handling of the cylinder inserts and valve assemblies, separate assembly thereof into the crankcase, and separate sealing thereof. In assembly, there are sometimes alignment problems.

It is an object of the present invention to provide a novel cylinder liner and valve assembly which can be inventoried and tested as a complete unit.

According to a feature of the invention, a cylinder liner with a valve structure pre-assembled thereon is inserted into a cylinder defined in a crankcase in a compressor is sealed therein by a simple seal, such as an O ring, and is secured in place by simple fastening means, such as a snap ring.

Another object of the present invention is to provide a cylinder sleeve and valve assembly that can be pretested with a piston and its connecting rod before assembly within a compressor, the cylinder sleeve and valve assembly and the piston end connecting rod being assembled in a crankcase in a compressor as a unit to facilitate fabrication of the compressor.

Another object of this invention is to provide a cylinder sleeve and valve assembly in which the valve structure comprises a series of stacked plates secured to the end of the cylinder sleeve and provided with gas inlet and discharge passages controlled by valve discs.

A still further object of the present invention is to provide an improved valve assembly formed by a stacked series of punched out discs integrally connected to form a valve plate having internal passages.

The above and other objects and features of the invention will be more readily apparent from the following descripiton in which.

Figure 1:
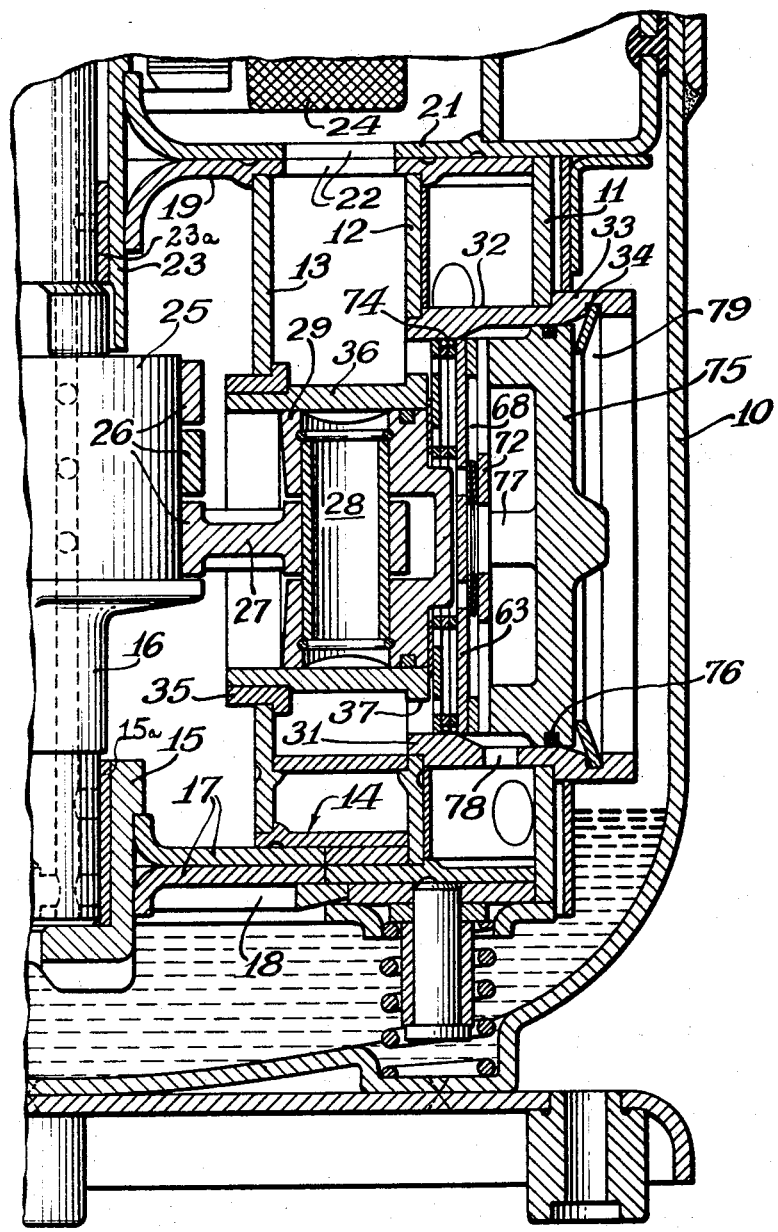
FIGURE 1 is a partial sectional view through a complete refrigeration compressor provided with a cylinder sleeve and valve assembly embodying the present invention.

The complete compressor to which the present invention may be applied is more particularly described and claimed in my copending application, Serial No. 587,005, filed October 17, 1966. The complete compressor comprises an outer casing 10 within which the compression mechanism and the drive motor therefor are housed. The compressor comprises a crankcase formed by three coaxial sleeves 11, 12 and 13, which are connected together at their lower ends by an annular base structure indicated generally at 14, which may be formed by a plurality of relatively thin laminated annular plates of different sizes or by a single relatively thick plate. As shown, the several plates forming the lower base structure are connected to each other and to the rings 11, 12 and 13 in a permanent fashion, as for example, by hydrogen brazing. The lower base structure also supports a bottom bearing 15a for a crankshaft 16. The bottom bearing housing 15 is preferably carried by plates 17 which fit under the uppermost plate in the bottom base structure 14 and abut at their edges against the inner edges of the next two lower plates as shown. The plates 17 may be secured in place by a snap ring 18 which snaps into a groove formed by the different sized plates in the base structure 14 as shown.

The upper end of the crankcase sleeves 11, 12 and 13 is closed by an upper end structure defined by annular plates or discs 19 and 21 which are secured to the upper ends of the sleeves 11, 12 and 13 by hydrogen brazing or similar processes. The plates 19 and 21 are formed with openings 22 therethrough through which incoming suction gas can flow to the space between the sleeves 12 and 13 and around the cylinder structure as will more readily be apparent hereinafter. The plates 19 also support an upper bearing housing 23 and bearing 23a for the crankshaft 16.

The space above the upper plates 19 and 21 and within the housing 10 receives a motor, a portion of whose stator is illustrated at 24. The rotor of the motor is connected to an upward extension of the crankshaft to turn it when the motor is energized.

The crankshaft is formed intermediate the bearings 15a and 23a with an eccentric portion 25 upon which connecting rods 27 are rotatable. While three connecting rods are shown for a three cylinder compressor, it will be understood that any greater or lesser number could be employed as desired. The connecting rod bearing portions 26 are journaled on the eccentric portion and the other end of connecting rod 27 is carried on a wrist pin 28 carried in piston 29 which is adapted to reciprocate in the cylinder structure in the usual manner.

The crankcase structure also includes a tubular valve housing 32 which has a reduced inner end portion as shown at 31 to fit into an opening in the intermediate sleeve 12. From its inner end the valve housing flares internally but is cylindrical externally for a distance equal to the spacing between the intermediate sleeve 12 and the outer sleeve 11. The intermediate cylindrical portion of the valve sleeve as shown at 32 extends through an opening in the outer sleeve 11. Beyond the outer sleeve 11, the valve housing terminates in an enlarged ring portion 33 which fits against the outer surface of the sleeve 11 and which is enlarged internally and formed with an internal groove 34 to receive a fastening such as a snap ring.

The inner sleeve 13 has a ring or sleeve retainer 35 secured therein which is preferably formed at its outer end with a flange to abut against the outer surface of the ring 13. It will be understood that the sleeve retainer 35 and the valve housing 32 are permanently secured in the crankcase during the process of its manufacture by hydrogen brazing or similar assembly method.

The cylinder sleeve and valve assembly of the present invention comprises a cylinder sleeve or liner 36 which is reduced in external diameter at its inner end to fit into the cylinder sleeve retainer 35 and which is formed with an external shoulder as shown to abut against the flange on the sleeve retainer 35 thereby to limit inward movement of the cylinder sleeve. At its outer end the cylinder sleeve has flat flange portion 37, which is of a diameter to fit within the inner end of the valve casing. The internal diameter of the cylinder sleeve is such as to receive the piston 29 for sliding movement, with suitable seals being provided on the piston to prevent leakage between the piston and cylinder sleeve walls.

Figure 2:
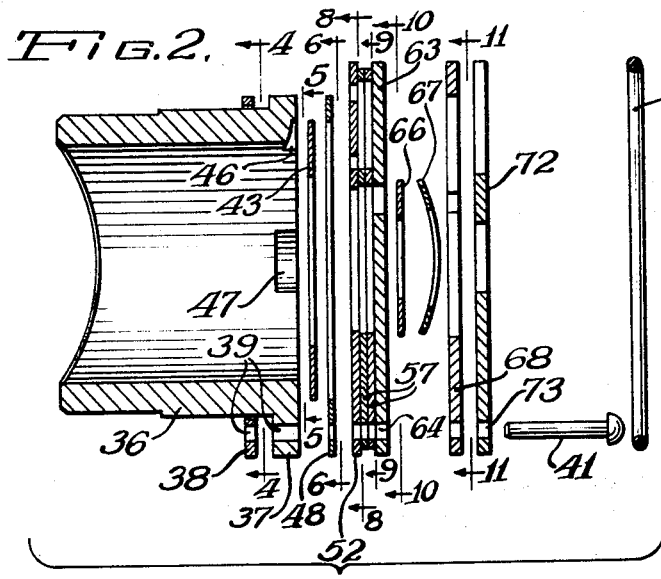
FIGURE 2 is a sectional exploded view of the cylinder sleeve and valve assembly taken on the broken line 2—2 of FIGURE 3.

The valve structure as best seen in FIGURE 2 is made up of a plurality of punched flat plates which are assembled on the end of the cylinder before the cylinder sleeve is inserted in the crankcase. As shown in FIGURE 2, a first ring 38 fits over the cylinder and abuts against the inner surface of the flange portion 37. This ring and the flange portion 37 are both formed with openings 39 therethrough to receive rivets 41 or similar fastenings which hold the cylinder sleeve and valve plates in assembled relationship. The retainer ring 38 is provided to furnish added strength in the event the liner is fabricated from a material that may require same, for example, a powdered metal. If liner 36 is made from steel or like strong material, retainer ring 38 is not required.

Figure 7:
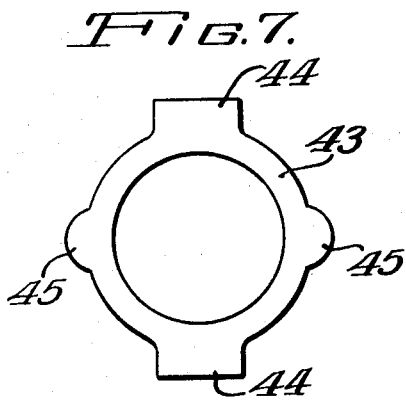
FIGURE 7 is a plan view of the suction valve disc.

Overlying the end of the cylinder sleeve 36 is an annular suction valve disc or reed 43. As shown in FIGURE 7, at diametrically opposite points the disc 43 is formed with outward projections 44. At similar diametrically opposite points spaced 90° from the projections 44, the disc 43 is formed with diametrically opposite smaller valve stop projections 45.

Figure 5:
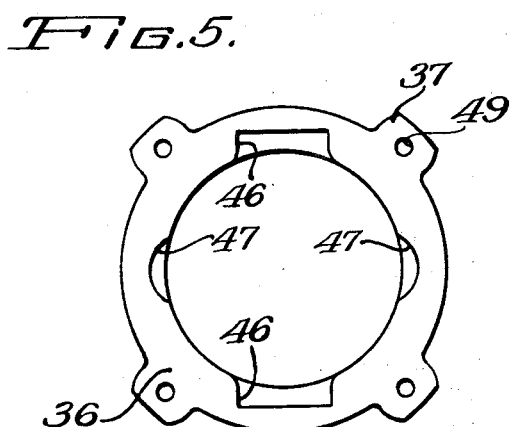
FIGURE 5 is a top view of the cylinder sleeve taken generally along line 5—5 of FIGURE 2.

The cylinder sleeve end, as seen in FIGURES 2 and 5, is formed at diametrically opposed points with small tapering recesses 46 for registering with the projections 44. The end of sleeve 36 is further provided with stop recesses 47 which will register with and receive the projections 45 on the valve disc. Projections 44 engage with recesses 46 to retain the suction valve disc in place at the end of the cylinder sleeve and prevent it from turning. The engagement of projections 45 with the bottom of recesses 47 limits inward flexing of the valve disc.

Figure 6:
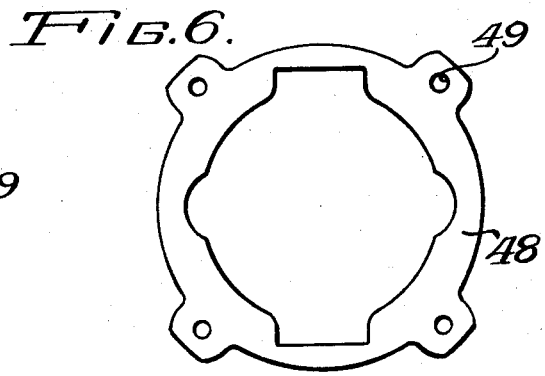
FIGURE 6 is a plan view of the gasket taken generally on line 6—6 of FIGURE 2.

Seal means are provided between the valve structure and the end of the cylinder sleeve. Such seal means may comprise a gasket 48 formed with a central opening of a size and shape to receive the valve disc 43 therein loosely so that it is relatively free to move. The gasket 48 (FIGURE 6) is provided with rivet openings 49 through which the rivets 41 may pass.

Figure 8:
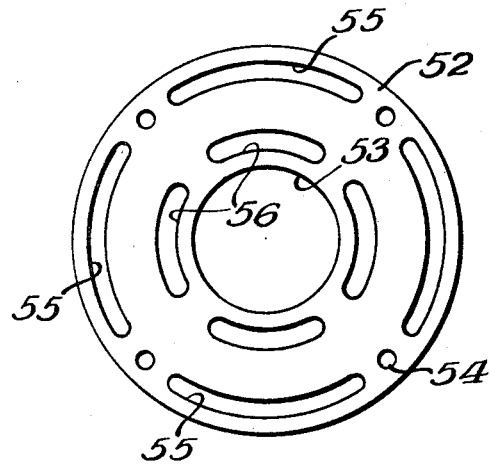
FIGURE 8 is a plan view of a plate of the valve assembly taken generally along line 8—8 of FIGURE 2.

A main valve plate assembly overlies the gasket 48 and closes the end of the cylinder sleeve. The valve plate assembly includes a plate 52 formed with a central opening therethrough as shown at 53 (FIGURE 8) with peripheral openings 54 to receive the rivets 41 and with additional peripheral openings 55 defining gas inlet passages. The disc or plate 52 is additionally provided with gas discharge ports 56 spaced radially between the central opening 53 and the openings 55.

Figure 9:
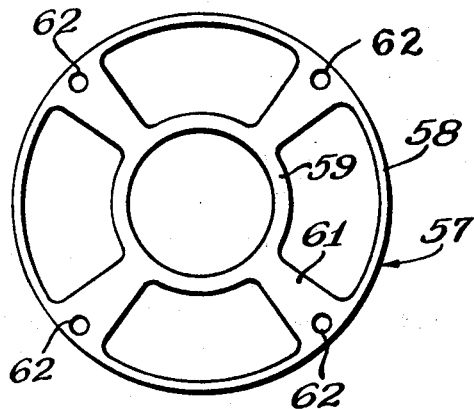
FIGURE 9 is a plan view of another plate of the valve assembly taken generally along line 9—9 of FIGURE 2.

Overlying the plate 52 are two identical plates 57 which are best shown in FIGURE 9. Each of these plates 57 is formed with a narrow annular rim portion 58 and a narrow inner annular rim portion 59 which are connected by radially extending spokes 61. The discs 57 are formed adjacent their periphery with openings 62 to receive the rivets 41.

Figure 10:
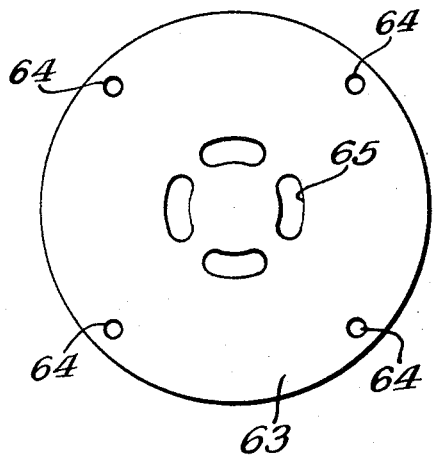
FIGURE 10 is a plan view of yet another plate of the valve assembly taken generally along line 10—10 of FIGURE 2.

Overlying the plates 57 is a plate 63 (FIGURES 2 and 10) which is formed adjacent to its periphery with openings 64 to receive the rivets 41. Adjacent to its center the disc 63 is formed with a series of discharge ports 65 which are spaced radially to register with the central openings through the valve disc 43 and plate 48, and the plates 52 and 57. For convenience, the plates 52, 57 and 63 are brazed or otherwise bonded to one another to form an integral assembly of parts.

Figures 12, 13:
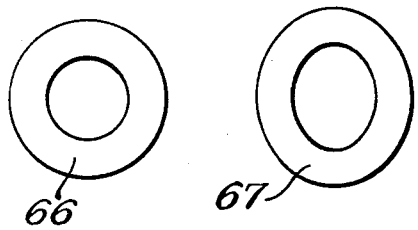
FIGURE 12 is an elevation of the discharge valve disc.
FIGURE 13 is a similar elevation of the discharge valve spring.

The discharge ports 65 are controlled by a discharge valve disc 66 which is in the form of an annular washer as best seen in FIGURES 2 and 12. A spring 67 (FIGURE 13) which is preferably in the form of a thin annular resilient disc overlies the discharge valve disc 66 and tends to press it into sealing engagement with the discharge ports 65.

Figure 11:
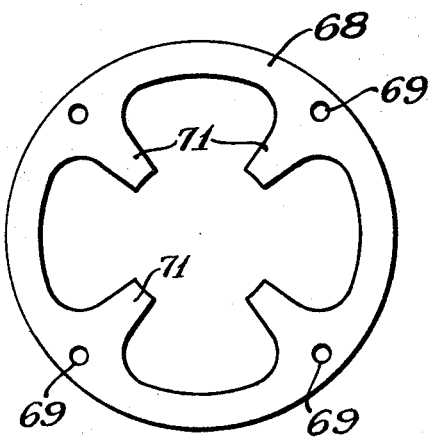
FIGURE 11 is a plan view of the discharge valve retainer taken generally along line 11—11 of FIGURE 2.

The discharge valve and spring discs are confined by a discharge valve guide plate 68 as best shown in FIGURE 11. This plate has an annular rim portion formed with rivet receiving openings 69 therein and with a plurality of spokes 71 extending radially inward from the outer annular rim portion. The inner ends of the spokes 71 are diametrically spaced to engage loosely the outer peripheral portions of the valve disc 66 and spring disc 67 to confine and guide the same.

Figure 3:
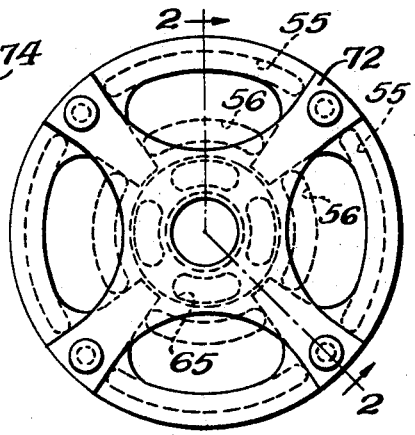
FIGURE 3 is an end view of the cylinder sleeve and valve assembly.
Figure 4:
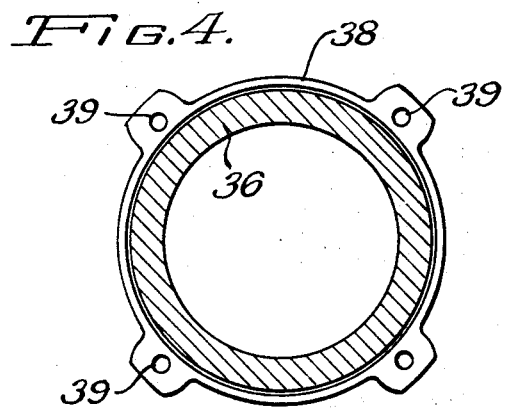
FIGURE 4 is a cross-sectioinal view of the cylinder sleeve taken generally along line 4—4 of FIGURE 2 and showing the retainer ring.

The valve assembly is completed by an outer valve spring retainer plate 72 which as best seen in FIGURE 3 is generally in the form of a cross. The arms of the cross of plate 72 are formed with openings 73 to receive the rivets 41 and the spaces between the arms overlie and register generally with the spaces between the inwardly projecting spokes 71 of the plate 68. The plate 72 holds spring 67 and retains the pressure thereof against discharge valve disc 66.

It will be noted that the plates 57 are of a smaller external diameter than the adjacent plates 52 and 63 so that an outer groove is provided in the valve assembly to receive a sealing ring, such as an O ring 74.

With the valve assembly components properly oriented and secured to the flange portion 37 of the cylinder sleeve 36, the cylinder sleeve and valve assembly is completed and ready for use. This assembly can readily be stocked as a unit. A piston and its associated connecting rod may conveniently be matched to a selected cylinder liner and valve assembly and the "top out" or spacing between the top of the piston and the bottom of the suction valve plate and valve plate assembly can be established.

In assembly, the cylinder sleeve and valve structure together with the piston and its connecting rod are assembled as a unit into a crankcase. The components are inserted through the valve housing 33 until the external shoulder on the cylinder sleeve abuts the ring 35. At this time the flange portion 37 on the cylinder sleeve and the valve assembly up through the plate 63 will lie in the small diameter cylindrical portion of the valve housing 33. As is apparent from FIGURE 1, the seal 74 engages the small diameter portion of the valve housing and provides a fluid tight seal thereagainst. The cylinder sleeve and valve assembly and the piston and associated connecting rod are held in place in the valve housing by a cylinder head or closure member 75 which is sealed at its periphery by a seal 76 into the intermediate diameter portions of the valve housing. The closure member is formed with legs 77 thereon which engage the outer plate 72 of the valve assembly and which provides spaces through which gas can flow to one or more discharge openings 78 formed in the valve housing in the intermediate diameter portion thereof. The closure member may be secured in place in the valve housing by a snap ring 79 or similar fastening.

It will thus be seen that with the cylinder sleeve and valve assembly of the present invention, the cylinder defining sleeve and the control valves therefor along with the piston and connecting rod can be assembled as a unit into the crankcase. When assembled the incoming gas flowing from the motor housing portion of the casing through the openings 22 will fill the space between the sleeves 12 and 13 around the cylinder 36. This gas can flow through the openings 55 at the periphery of the plate 52 into the main valve assembly. The gas will then flow through the spaces provided by the openings in the plates 58 radially inward to the inlet ports 56 in the plate 52. On the suction stroke of the piston, the suction valve disc 43 will be deflected away from the inlet ports 56 so that gas can flow through these ports and into the cylinder. On the pressure or discharge stroke of the piston, the disc 43 will seat over the inlet ports 56 and prevent backflow of gas. The compressed gas will, however, flow through the central openings in the valve disc 43, the plate 52 and the plates 58 to the outlet ports 65 in the plate 63. Pressure of the gas will unseat the discharge valve disc 66, which is normally held against the outlet ports 65 by the spring 67, and the gas will flow through the spaces between the spokes 71 of the plate 68 and through the spaces between the arms of the plate 72 and then around the legs 77 of closure plate 75 to flow out through the outlet passages 78 in the valve housing into the space between the sleeves 11 and 12. This space constitutes a discharge gas space from which the gas may flow to a condenser in a refrigeration system.

While one embodiment of the invention has been shown and described in detail, it will be understood that this is for the purpose of illustration only and is not to be taken as a definition of the scope of the invention, reference being had for this purpose to the appended claims.

What is claimed is:

1. In combination with a compressor having a crankcase formed by three coaxial sleeve having radially registering openings therethrough and a tubular valve housing secured in the openings in the outer two sleeves, the space between the inner two sleeves constituting a gas inlet space and the space between the outer two sleeves constituting a gas discharge space, a cylinder sleeve and valve assembly comprising a cylinder sleeve and a valve structure secured to the outer end of the cylinder sleeve and including inlet and outlet passages and check valve means controlling the passages, said assembly being insertable through the valve housing with the inner end of the cylinder sleeve fitting through the opening in the inner wall and the outer end of the cylinder sleeve and the valve structure in the valve housing, the outer end of the assembly being formed with a passage communicating with the inlet passage in the valve structure and the gas inlet space and the valve housing having an opening therein communicating with the outlet passage in the valve housing and the gas discharge space.

2. The mechanism of claim 1, including sealing means carried by the cylinder sleeve and valve assembly for sealing between the assembly and the tubular valve housing.

3. The mechanism of claim 2, including fastening means engaging the tubular valve housing and the outer end of the cylinder sleeve and valve assembly for retaining the assembly in place.

4. A cylinder sleeve and valve assembly for a compressor comprising a cylinder sleeve having outwardly extending flange means at one end formed with a gas inlet opening therethrough and a valve assembly including a series of stacked flat plates secured to said flange means, the first plate having a gas inlet opening adjacent to its periphery registering with the gas inlet opening and including a central valve disc portion formed with a central opening communicating with the cylinder, the next adjacent plate having an inlet port near its periphery registering with the inlet openings and a central opening registering with the central opening in the disc portion and an outlet port radially between the inlet port and the central opening and registering with the disc portion to be controlled thereby, the next adjacent plate being formed with a central opening registering with the central openings in the first named plates and with radially extending openings spanning the inlet and outlet ports, the next adjacent plate being formed with a central discharge port registering with the central openings in the first named plates, a discharge valve disc overlying the discharge port, a spring urging the valve disc against the discharge port, and spring retaining means secured to the plates.

5. A cylinder sleeve and valve assembly as in claim 4 in which the first named plate comprises an outer portion formed with a non-circular opening therein extending at diametrically opposite points beyond the bore in the cylinder sleeve and a separate flexible valve disc fitting in the opening and having diametrically opposite projections thereon overlying the cylinder sleeve flange, the cylinder sleeve end having a recess therein registering with one of the projections to guide movement of the valve disc away from the outlet port.

6. A cylinder sleeve and valve assembly as in claim 6 in which the valve disc has additional projections thereon spaced 90° from the first named projections and the cylinder sleeve has axially extending recesses therein slidably to receive the last named projections, the axially extending recesses limiting movement of the valve disc.

7. A cylinder sleeve and valve assembly as in claim 5 in which the spring is a curved disc of thin resilient material and the spring retaining means comprises a plate overlying the last named plate and having spaced fingers extending radially inwardly and engaging the valve and spring discs and an outer plate overlying the last named plate and against which the spring disc seats.

8. A cylinder sleeve and valve assembly as in claim 4 in which the cylinder sleeve and valve assembly are riveted to one another.

9. A valve assembly for a compressor comprising a series of stacked flat plates, the plate at one end of the series having a non-circular central opening, a flexible valve disc fitting in the opening and formed with a central opening therethrough, the next adjacent plate being formed with an inlet port adjacent its periphery and with a central opening registering with the central opening in the disc portion and with an outlet port radially between the inlet port and the central opening, said disc portion normally overlying the outlet port to prevent entrance of gas into the outlet port but being deflectable away from the outlet port to permit egress of gas therefrom, the next adjacent plate being formed with a central opening registering with the central openings in the first two named plates and with radially extending openings spanning the inlet and outlet ports, the next adjacent plate being formed with a discharge port registering with the central openings in the plates, a valve disc overlying the discharge port, a spring urging the valve disc to seat against the discharge port, and retaining means for the spring secured to the discs.

10. The valve assembly of claim 9 in which the valve disc and the spring retaining means comprises a plate overlying the last named plate and formed with spaced fingers extending inwardly from its periphery and whose inner ends engage the valve and spring discs and an outer plate overlying the last named plate and against which the spring seats, the outer plate being formed with openings for passage of gas therethrough.

References Cited

UNITED STATES PATENTS

| | | | |
|---|---|---|---|
| 2,578,139 | 12/1951 | Jones | 230—238 XR |
| 2,948,461 | 8/1960 | Frank | 230—238 XR |
| 2,955,749 | 10/1960 | Tomkowiak | 230—172 |
| 3,066,856 | 12/1962 | Frank | 230—231 |
| 3,071,309 | 1/1963 | Hackbart | 230—238 |

ROBERT M. WALKER, *Primary Examiner.*